March 10, 1936.  W. H. COLES ET AL  2,033,880
IRRIGATION DEVICE
Filed May 21, 1932
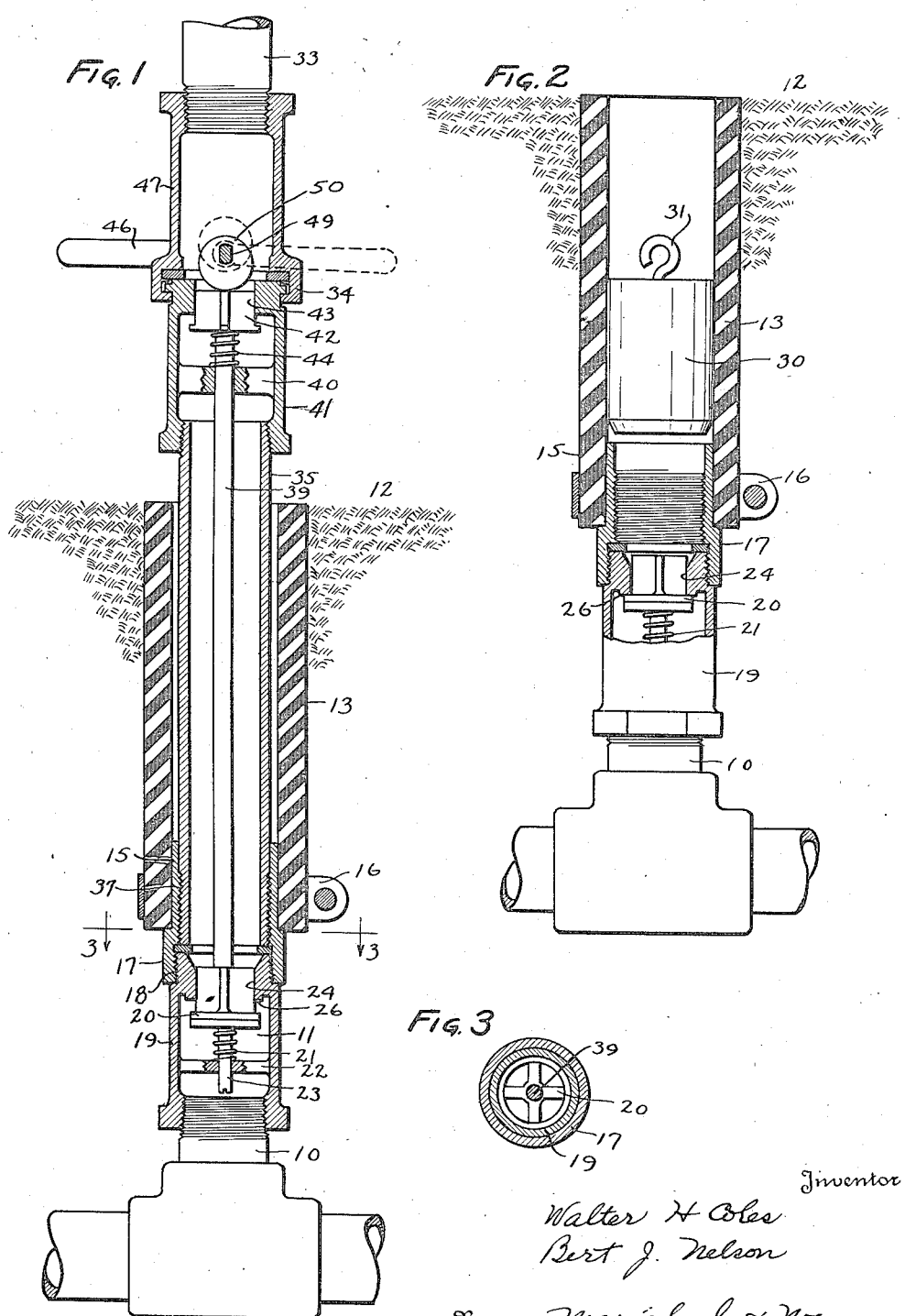
Inventor
Walter H Coles
Bert J. Nelson
By Maréchal & Noe
Attorney Patented Mar. 10, 1936

2,033,880

UNITED STATES PATENT OFFICE 2,033,880

IRRIGATION DEVICE

Walter H. Coles and Bert J. Nelson, Troy, Ohio, assignors, by direct and mesne assignments, of one-half to The Skinner Irrigation Company, Troy, Ohio, a corporation of Ohio, and one-half to William A. Buckner, Fresno, Calif.

Application May 21, 1932, Serial No. 612,771

7 Claims. (Cl. 137—13)

This invention relates to sprinkling systems and more particularly to sprinkling systems in which portable sprinklers are connected to water supply conduits which are arranged below the ground level so that when the portable sprinkler is disconnected and removed there will be no obstruction above the surface of the ground.

One object of the invention is the provision of a sprinkling system having a self-closing valve provided below the ground level, the valve being adapted for ready attachment to a sprinkler supporting pipe which extends up from the valve through a flexible walled tube reaching up to the level of the ground, so that when the sprinkling pipe is removed the top of the flexible walled tube provides a surface giving a tread for a person's shoe or for the iron shoe of a horse which is similar to the tread of the ground.

Another object of the invention is the provision of a sprinkling system in which a flexible walled tube is provided on an underground self-closing valve so that the top of the tube is even with the ground surface, the tube having closure means provided well below the top of the tube to prevent dirt or the like from falling down into the valve, so arranged that the closure means may be pulled up out of the tube to clean the tube and remove any dirt that might have fallen into its upper open end.

Other objects and advantages of the invention will be apparent from the following description, the appended claims and the accompanying drawing, in which—

Fig. 1 is a vertical central section through a portion of a sprinkling system embodying the present invention;

Fig. 2 is a view shown partly in section showing the sprinkler supporting pipe applied to the underground valve cassing; and Fig. 3 is a section on the line 3—3 of Fig. 1.

The present invention relates to a sprinkling system for baseball parks, polo grounds, play fields and the like in which there is an underground system of water supply pipes to which portable sprinklers may be connected at various spaced points. In watering a baseball diamond for example there may be several outlets in the outfield and one or more in the infield providing connections where portable sprinklers may be attached from time to time when the field is not in use. When the field is in use, however, the portable sprinkers are removed. It has been the practice in sprinkling systems of this general characters to provide a cap or closure for the top of the sprinkling pipe outlet wherever these outlets occur, but such a cap or closure member, being of quite considerable extent and being necessarily quite hard, provides a spot on the ground which has a tractive resistance or effect when stepped on by one running after a ball or when trod on by the shoe of a horse which is quite different from the tractive resistance or effect of the ground.

In accordance with the present invention the underground water supply pipes 10 of an underground water distributing system are provided at each outlet point with a self-closing valve 11 provided well below the ground level 12. A flexible walled tube 13 extends up from the top of the valve 11, the upper end of the tube 13 being arranged flush or even with the surface of the ground as shown in Fig. 1. The tube 13 is preferably a cylindrical thick walled member constructed of rubber preferably reinforced with fabric. The tube is sufficiently flexible so that its top can be deformed when trod upon, although its walls are thick enough so that it will not be moved permanently or objectionably out of shape when the ground immediately adjacent thereto is pressed. The upper end of the tube is normally open so that there will not be an objectionable continuous surface on which a shoe would slip, the tractive resistance or effect offered by the hollow tube being of a character which is about the same as that offered by the adjacent ground. As the tube is of a rather soft and yielding character, if the projecting lug on the end of a horse's shoe comes in contact with it the tube can yield sufficiently to avoid injury and immediately return to its normal position when the shoe is removed.

The lower end of the tube 13 is provided on a cylindrical wall 15 of the valve 11, being preferably held in place by means of a strap 16 encircling the outside of the tube. The cylindrical surface 15 is preferably provided on a portion 17 of the valve which is threaded at 18 on the lower valve portion 19, the portions 17 and 19 forming a valve casing in which the self-closing valve 20 is arranged. The lower end of the valve portion 19 is threaded so that it may be secured on the threaded end of the underground water supply pipe 10.

The valve 20 is of such character that it is closed by the pressure of the water below it, the closing action of the valve being assisted by a compression spring 21 which bears at its lower end against a cross rib 22 which may be integrally cast with the valve portion 19. A guide pin 23 extends freely through the rib 22 and is secured at its upper end to the lower side of the valve closure member thus serving as a guide for the closure member. The upper end of the valve member is guided in a cylindrical opening 24 in the valve portion 19, it being understood that when the valve member is pushed down the water can flow past the valve and up through the opening 24. Normally, however, the valve is in its raised position bearing against the seat 26 as shown in Fig. 2 and thus shutting off the flow of water up through the valve.

When the water outlet is not in use the flexible walled tube 13 contains a plug or closure 30 which may be of rubber or any other desired material and which preferably fits snugly within the tube so as to prevent any dirt that might fall into the upper end of the tube from passing down into the valve. Normally the upper end of the tube 13 is open because the top of the plug or closure 30 is well below the ground level as shown in Fig. 2. When it is desired to use the water outlet for sprinkling the adjacent ground, the plug 30 is removed by pulling up on the handle or ring 31 which can be reached by a suitable tool, and as the plug moves up in the tube it cleans out any dirt or stones that might have fallen in above it. This exposes the valve so that the portable sprinkler which is to be connected to the outlet can be readily secured in place.

The portable sprinkler is carried by a pipe 33 which is fixed on a connection 34 provided at the upper end of a vertical pipe 35. The pipe 35 is long enough and smaller in diameter than the inside dimensions of the tube 13 so that it can be readily passed down into the tube and so that its threaded lower end can be secured into the threads 37 which are provided in the valve member 17. When thus threaded in place on the valve casing, the pipe 35 supports the connection 34 above the level of the ground.

Within the pipe 35 is suitable means for causing operation of the valve. As herein shown, the pipe contains a rod 39 which is guided for vertical movements and held in a centered position by means of a cross rib 40 arranged in the connection member 41. The upper end of the rod 39 is secured rigidly to a pair of cross plates 42 which are guided in the cylindrical passage 43 in the connection member 41. A spring 44 is shown arranged to hold the rod 39 normally in its uppermost position so that the bottom of the rod will be slightly above the top of the valve 20. Vertical movements of the rod 39 are controlled by a handle 46 pivotally mounted in the connection member 47 which may be secured to the connection member 41 by means of a suitable bayonet connection permitting the attachment of the member 47 by merely applying it to the top of member 41 and then turning the former through a part of a revolution. The lever 46 is secured to a rotatable shaft 49 which carries an eccentric cam 50, the cam 50 being arranged to depress the cross plates 42 when the lever 46 is moved from its normal horizontal position indicated in dotted lines in Fig. 1. When the cross plates 42 are depressed the rod 39 is forced down and its lower end engages and presses down on the top of the valve 20, thus opening the valve and permitting the water to flow up through the pipe 35 and through the connection 34 to the sprinkler provided on the pipe 33. When the sprinkling operation has been completed, the lever 46 is turned so as to shut off the supply of water, the valve 20 closing under the force of the water and by means of the spring 21. The entire sprinkling device including the pipe 35 is then removed from the underground valve, the removal of the sprinkling device being facilitated by the bayonet connection of the two connection members 47 and 41 which may be quite readily separated in a quick and simple manner before unscrewing the pipe 35 from the valve casing. When the pipe 35 is removed and drawn up through the tube no flow of water takes place from the self-closing valve so that the sprinkler can be carried over to a second outlet and attached and started in operation without turning off the water supply of the system. After removing the pipe 35 from the tube, the plug 30 is pushed down in the tube so that its top is well below the top of the tube 13, leaving the top of the tube open so as to offer a tread which may be of substantially the same character as the ground itself.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a water distributing system of the character described, an underground distributing pipe, a valve casing connected to said pipe and provided entirely below the ground level, a self-closing valve in said casing, a flexible walled tube fixed to said valve casing and extending upwardly therefrom a distance exceeding the diameter of the tube opening with its upper end provided even with the ground level, a water conduit of a diameter of the same order as the inside diameter of the said tube adapted to be detachably supported within said tube, and means carried by said water conduit for opening said valve.

2. In a water distributing system of the character described, an underground distributing pipe, a valve casing connected to said pipe and provided entirely below the ground level, a self-closing valve in said casing, a flexible walled tube fixed to said valve casing and extending upwardly therefrom a distance exceeding the diameter of the tube opening with its upper end provided even with the ground level, said valve casing having means adapted for detachable connection with a distributing pipe, and closure means of yielding material within said tube adapted to be withdrawn upwardly from said tube.

3. In a water distributing system of the character described, an underground distributing pipe, a valve casing connected to said pipe and entirely below the ground level, a self-closing valve in said casing adapted to prevent flow therethrough when the valve is in its upper position, a cylindrical flexible walled tube fixed to said valve casing and extending upwardly therefrom a distance exceeding the diameter of the tube opening with its upper end provided even with the ground level, and readily removable closure means for said tube arranged in said tube with its upper end well below the top of the tube, the top of the tube being open for a distance commensurate with the tube diameter.

4. In a water distributing system of the character described, an underground distributing pipe, a valve casing connected to said pipe and provided entirely below the ground level, a self-closing valve in said casing, a cylindrical flexible rubber walled tube fixed to said valve casing and extending upwardly therefrom a distance exceeding the diameter of the tube opening with its upper end provided even with the ground level, a vertical pipe having an outside diameter slightly less than the inside diameter of said tube and extending up from said valve casing through said tube and reaching above the top of the tube and detachably connected to the valve casing at its lower end, and operating means for said valve carried by said vertical pipe.

5. In a water distributing system of the character described, an underground distributing pipe, a valve casing connected to said pipe and provided entirely below the ground level, a self-closing valve in said casing, a cylindrical flexible walled tube fixed to said valve casing and extending upwardly therefrom a distance exceeding the diameter of the tube opening with its upper end provided even with the ground level, a pipe adapted for detachable connection with the upper end of said valve casing and extending up above the top of said tube, said pipe having an outside diameter only slightly less than the inside diameter of the said tube, a vertical rod movably mounted in said vertical pipe and adapted for engagement with said valve, and means carried by the upper end of said pipe for vertically moving said rod to provide for the manual opening and closing of the valve.

6. In a water distributing system of the character described, an underground distributing pipe, a valve casing connected to said pipe and provided entirely below the ground level, a valve in said casing operable to close the passage through said casing, a flexible walled tube fixed to said valve casing and extending upwardly therefrom a distance exceeding the diameter of the tube opening, with its upper end provided even with the ground level, a water conduit of a diameter of the same order as the inside diameter of the said tube adapted to be detachably supported within said tube with its lower end connected to said valve casing and means carried by said water conduit for opening said valve.

7. In a water distributing system of the character described, an underground distributing pipe, a valve casing connected to said pipe and provided entirely below the ground level, a valve in said casing operable to close the passage through said casing, a flexible walled tube fixed to said valve casing and extending upwardly therefrom a distance exceeding the diameter of the tube opening with its upper end provided even with the ground level, said valve casing having means adapted for detachable connection with a distributing pipe, and closure means of yielding material within said tube adapted to be withdrawn upwardly from said tube.

WALTER H. COLES.
BERT J. NELSON.